United States Patent Office 2,992,195
Patented July 11, 1961

2,992,195
PREPARING MODIFIED POLYAMIDE RESINS
Harland H. Young, Western Springs, and Stewart B. Luce, La Grange, Ill., assignors to Swift & Company, Chicago, Ill., a corporation of Illinois
No Drawing. Filed Nov. 29, 1957, Ser. No. 699,479
10 Claims. (Cl. 260—18)

The present invention relates to polyamide resins, and more particularly to modified thermoplastic resins of polymeric fatty acids.

When unsaturated fatty acids which occur either in the free form or as an ester in fats and oils of vegetable and animal origin such as linoleic acid, linolenic acid, and eleostearic acid are subjected to polymerization conditions, they are converted to dimeric and trimeric carboxylic acids. These dimerized and trimerized acids form thermoplastic resins known as polyamides when they are condensed with alkylene diamines and polyalkylene triamines. The preparation of polyamides is described in U.S. Patent No. 2,379,413, which is owned by General Mills, Inc., and U.S. Patent No. 2,450,940, which issued to John C. Cowan et al. on October 12, 1948.

Polyamide resins of the type described in the patents range from tacky thermoplastic materials not unlike other elastomeric polymers to hard, brittle, relatively inert materials. The softer and more fluid members of the group are characterized by high amine values and relatively low melting points, whereas the hard, brittle members have low amine values. Polyamides, in general, have a poor resistance to peeling when used as adhesive compounds. They do have the advantage, however, of wetting and adhering to metal surfaces, and therefore are widely used for metal adhesion even though their peel strength is low.

One of the objects of the present invention is to provide a method of modifying polyamide resins which substantially improves their peel strength while still retaining their ability to wet and adhere to metal surfaces.

Another object of the invention is to provide a method of raising the melting point of polyamide resins.

A further object is to lower the basic amine value of the polyamide resins.

Another object is to improve the strength of polyamide resin films.

Yet another object of the present invention is to modify the surface tackiness of polyamide resins so as to reduce their tendency to "block."

Another object of the present invention is to provide modified polyamide resins embodying the above described characteristics.

In general, the present invention is based on the discovery that if polyamide resins of the type disclosed in U.S. Patents Nos. 2,379,413 and 2,450,940 are heated to particular temperatures with relatively small quantities of certain nitrogen compounds, the resulting products will have a higher melting point, increased toughness, improved film and peel strength, and a lower amine value. Nitrogen materials which have been found to provide these improved characteristics are urea, monosubstituted ureas, asymmetrically disubstituted ureas, malonamide, malononitrile, hydrazine, dimethyl hydantoin, and phthalimide.

In carrying out the subject process, the required amount of modifier is added to the premelted or fluid polyamide resin with constant stirring slowly enough to permit the evolution of ammonia to be controlled. The reaction temperature is then raised to a point above the decomposition temperature of the particular modifying agent. The tendency of the reactants to foam during the heating period can be reduced by adding a trace of a defoamer such as silicone grease to the melt. At the end of about an hour, the ammonia evolution is usually over, thereby indicating that the reaction has ended. An increase in viscosity occurs on cooling, and when the desired consistency is reached, the modified resin is cast.

The temperature to which the melt is raised after the modifier has been added depends on the decomposition point of the modifier. Where urea is used, for example, the mass should be heated to at least about 275° F. to 285° F. inasmuch as urea decomposes at temperatures slightly above its melting point of 270.9° F. At temperatures which are close to the decomposition point of the modifier, the reaction, of course, takes considerably longer to complete than it would at a higher temperature of, for example, 400° F.

The effect of the nitrogen containing material on the resin is such that maximum modification takes place at lower levels of addition. For example, a small amount of urea markedly lowers the amine value of the resin, whereas additional quantities only slightly increase the modifying effect of the additive.

If a mixture of polyamide resins is modified, a skin tends to form on the surface of the melt and the final product often is excessively brittle. By first reacting urea or another of the additives with the lower melting polyamide and then adding the higher melting resin, however, brittleness in the finished product is avoided and skinning of the melt is reduced to a minimum.

In addition to the polyamide resins described in Patent Nos. 2,379,413 and 2,450,940, other suitable polyamide resins include those compounds manufactured and sold by General Mills, Inc., under the trademark Versamid. Versamids are described in detail in Technical Bulletin 11–A, which was copyrighted in 1955 by General Mills, Inc., and is entitled, "Versamids—The Versatile Polyamide Resins."

The following examples are illustrative of the present method and composition of matter and are not to be considered as limiting thereof:

*Example I*

Five lots of Versamid 100 (a polyamide resin prepared as described in U.S. Patent No. 2,379,413) weighing 100 gms. each were melted at 280°–300° F. with stirring. A trace of a silicone defoamer and varying amounts of urea ranging from ½ gm. to 10 gms. were added to the resin. Thereafter, the temperature of each lot was raised with stirring to 400° F. over a 45-minute period. The final melt was poured out to cool and the following data determined:

| Gms. of Resin | Gms. Urea | Melting Point, °C. | Amine Value | Peel Strength |
|---|---|---|---|---|
| 100 | 0.00 | 43 | 81.4 | 2.2 |
| 100 | 0.50 | 67 | 70.8 | 3.0 |
| 100 | 2.0 | 79 | 63.3 | 6.4 |
| 100 | 5.0 | 81 | 60.0 | 9.3 |
| 100 | 10.0 | 84 | 56.2 | 12.3 |

The above results, in general, demonstrate the changes that take place in the properties of a polyamide resin when various amounts of urea are reacted with the resin under certain conditions. The melting points of the products were determined by the standard Ball and Ring method. The amine value of the resin is given as the number of milligrams of potassium hydroxide which is equivalent to the amine alkalinity found in one gm. of sample. Peel strength is considered to be the weight in pounds per inch width of strip required to pull adhered surfaces apart at the rate of one linear inch per minute at room temperature (70–75° F.). Versamid 100 has an amine value of 83–93, a melting point of 43°–53° C., and is a soft, tacky resin that is semi-solid at room temperature.

Example II

One hundred (100) gms. of Versamid 100 was melted at 300° F. A small quantity of a silicon defoamer and 5 gms. of urea were then added to the resin. The temperature of the product was raised and kept at 400° F. with stirring until the evolution of ammonia was substantially completed. After casting and cooling the resin, its peel strength was found to be 19 pounds in contrast to 2.2 pounds for the untreated product.

Example III

Due to the fact that the viscosity and brittleness of a resin increases as the level of urea is raised, a composition was formulated using the lowest percentage of urea possible to provide minimum viscosity rise and maximum flexibility at low temperature, and yet increase the peel strength of the product. This product was prepared by adding 0.2 gm. of urea and a trace of silicone grease to 84.5 gms. of Versamid 100 which had been melted at 300°–350° F. The evolution of ammonia subsided when the temperature reached 400° F. (30–45 minutes). At this point, 10.5 gms. of Versamid 940 (a polyamide prepared as described in U.S. Patent No. 2,379,413 and having an amine number of 3 and a softening point of 105–115° C.) was added to the product, followed by 4.8 gms. of polyvinyl butyral. When the product reached a uniform stage, the melt was chilled and used to bond strips of can metal. The adhesive had a peel strength of 6.9 pounds per inch at one linear inch per minute. A product identical to that prepared as shown above except that the urea reaction was omitted gave a peel strength of 4.7 pounds per inch at one linear inch per minute.

Although polyvinyl butyral improves the peel strength of polyamide resins even without preliminary cross-linking with urea, it has the major drawback of increasing viscosity to a point where the melt will not operate on machines using hot melt adhesives. Therefore, our invention is particularly useful for cementing side seams in metal cans.

Example IV

The following products were prepared by the method shown in Example II except that other nitrogen compounds were substituted for urea and other concentrations were used:

| Additive | Amount Based on Weight of Polyamide, percent | Increase in Melting Point, ° C. | Other Changes |
|---|---|---|---|
| 1. malonamide | 3.4 | | Product gelled at 150° C. |
| 2. hydrazine hydrate | 1.3 | 17 | |
| 3. n-carbamyl butanolamine | 4.4 | 11 | |
| 4. dimethyl-hydantoin | 4.3 | 18 | |
| 5. malononitrile | 2.0 | 12 | |
| 6. phthalimide | 5.0 | 9 | Amine value dropped 20.2 units. Peel strength increased 20%. |
| 7. phthalimide | 10.0 | 10 | Amine value decreased 40 units. Peel strength increased 300%. |

Example V

Two hundred ninety-five (295) grams of a mixture of dimerized and trimerized oleic acid (Emery 3079–S polymerized fatty acids described in Emery Industries Development Product Bulletin No. 69, dated October 1956) was added to 56.5 grams of diethylene triamine under a nitrogen blanket. The reactants were heated in a vessel with stirring at temperatures up to 220° C. for 1 hour, at 220–250° C. for 1 hour, and at 250–275° C. for ½ hour. During the second hour, the reaction equipment was arranged to distill off volatile components and for the last ½ hour nitrogen was bubbled through the mixture. When the temperature reached 275° C. the product was allowed to cool.

One hundred (100) grams of this resin was melted and then mixed with 2 grams of urea at a temperature of 140° C. The reactants were heated at 140–170° C. for 1 hour during which time ammonia was given off. When the temperature reached 170° C. the evolution of ammonia stopped and the product was allowed to cool. The modified resin had a melting point of 55° C. and an amine value of 83.

In addition to the above described method, the subject compounds can be formed by (1) reacting urea or another of the modifiers with the dimerized or trimerized acid before the acid is condensed with the diamine or polyamine, (2) modifying the diamine or polyamine with one of the subject additives prior to the condensation reaction with a dimeric or trimeric acid, and (3) heating a mixture of urea or other suitable nitrogen compound, dimeric and/or trimeric acid, and diamine and/or polyamine to a point above the decomposition temperature of the additive.

Example VI

This example shows a method of preparing a resin of the present invention by heating a mixture of a polymeric fatty acid, a polyamine, and a nitrogen containing compound.

Two hundred ninety-five (295) grams of Emery 3079–S polymerized fatty acid (a mixture of dimerized and trimerized oleic acid), 7 grams of urea, and 56.5 grams of diethylene triamine were mixed together in a flask and placed under a nitrogen blanket. The reactants were heated with stirring at temperatures up to 205° C. for about 1 hour, at 205–225° C. for ½ hour, at 225–245° C. for ½ hour, and at 245–275° C. for ½ hour. Ammonia gas was given off by the reactants until the temperature reached 225° C. at which point the rate of evolution slowed perceptibly. Nitrogen was bubbled through the mixture for the last ½ hour of the reaction. When the temperature reached 275° C. the product was allowed to cool.

The following table sets forth a comparison between (1) an unmodified polyamide, (2) a polyamide heated with urea as is shown in Example V, and (3) a polyamide prepared by the method of Example VI.

| | Unmodified Polyamide, ° C. | Polyamide Heated with Urea, ° C. | Polyamide Modified as in Example VI, ° C. |
|---|---|---|---|
| Melting Point | 48 | 55 | 48 |
| Amine Value | 88 | 83 | 56 |

As is evident from the table, a flexible process results when urea or another of the nitrogen compounds is added to the reactants during the condensation of the polyamine and polymeric fatty acid. This variation of the method makes it possible to produce certain desired characteristics by altering the amine value of the resin without substantially changing the melting point of the product.

The concentration of urea or other nitrogen containing compound of the present invention used in modifying the polyamide depends on the degree of modification desired. As an illustration, the table in Example I shows that 0.5 percent urea changes the melting point of the resin 24° C. whereas the peel strength varies only slightly at this concentration. On the other hand, the melting point increased only slightly with additional amounts of urea, while succeeding peel strength determinations show substantial corresponding changes.

If 0.24 gram of urea was added to Versamid 100 rather than the 0.5 quantity of Example I, the increased peel strength would not be appreciable although the change in melting point and amine value would be substantial. Where Versamid 100 is used the lower limit of additive range would be about 0.1 percent when the modification is made to alter the melting point or amine value of the resin. The upper limit is dependent on the amine value of the polyamide. Beyond the point at which molecular proportions are used, i.e. 1 mole urea for every amine group, the urea or other nitrogen containing compound of the present invention would probably have no further effect. For Versamid 100, which has an amine value of from about 83–93, this would be about 13 percent urea.

As is stated above, General Mills Inc. manufactures and sells a series of polyamide resins which are suitable for use in the present invention. These compounds are described in various technical bulletins distributed by the Chemical Division of General Mills. Bulletin 11-A, entitled "Versamids—The Versatile Polyamide Resins," sets forth the amine values and melting points of 7 polyamide resins which are said to be produced as shown in U.S. Patent No. 2,379,413. It is compounds of this type which are identified herein by the term polyamide.

Obviously many modifications and variations of the invention as hereinbefore set forth may be made without departing from the spirit and scope thereof, and therefore only such limitations should be imposed as are indicated in the appended claims.

We claim:

1. A method of treating polyamide resins prepared from alkylene polyamines and polymeric fatty acids which comprises adding to said resins a minor amount of a nitrogen containing compound selected from the group consisting of urea, monosubstituted ureas, asymmetrically disubstituted ureas, malonamide, malononitrile, hydrazine, dimethyl hydantoin, and phthalimide, and thereafter heating the resin to a point above the decomposition temperature of said nitrogen containing compound.

2. A method as in claim 1 wherein the nitrogen containing compound is urea.

3. A method of preparing modified polyamide resins which comprises adding to a compound selected from the group consisting of diamines and polyamines a minor amount of a nitrogen containing compound selected from the group consisting of urea, monosubstituted ureas, asymmetrically disubstituted ureas, malonamide, malononitrile, hydrazine, dimethyl hydantoin, and phthalimide, and heating the mixture to a point above the decomposition temperature of said nitrogen containing compound, and thereafter reacting the resultant material with a compound selected from the group consisting of dimerized and trimerized fatty acids.

4. A method as in claim 3 wherein the nitrogen containing compound is urea.

5. A method of preparing modified polyamide resins which comprises adding to a compound selected from the group consisting of dimerized and trimerized fatty acids a minor amount of a nitrogen containing compound selected from the group consisting of urea, monosubstituted ureas, asymmetrically disubstituted ureas, malonamide, malononitrile, hydrazine, dimethyl hydantoin, and phthalimide, heating this mixture to a point above the decomposition temperature of said nitrogen containing compound, and thereafter reacting the resultant material with a compound selected from the group consisting of diamines and polyamines.

6. A method as in claim 5 wherein the nitrogen containing compound is urea.

7. A method of preparing modified polyamide resins which comprises adding to a compound selected from the group consisting of diamines and polyamines and mixtures thereof, dimerized and trimerized fatty acids and a minor amount of a nitrogen containing compound selected from the group consisting of urea, monosubstituted ureas, asymmetrically disubstituted ureas, malonamide, malononitrile, hydrazine, dimethyl hydantoin, and phthalimide, and thereafter heating these materials to a point above the decomposition temperature of said nitrogen containing compound.

8. A method as in claim 7 wherein the nitrogen containing compound is urea.

9. A new and useful resinous compound prepared as set forth in claim 1.

10. A method of preparing modified polyamide resins prepared from alkylene polyamines and polymeric fatty acids selected from the group consisting of oleic, linoleic, linolenic and eleostearic acids, which comprises adding to said resins a minor amount of a nitrogen-containing compound selected from the group consisting of urea, monosubstituted ureas, asymmetrically disubstituted ureas, malonamide, malononitrile, hydrazine, dimethyl hydantoin, and phthalamide and thereafter heating the resin to a point above the decomposition temperature of said nitrogen-containing compound whereby to improve the toughness of said resin and decrease the tackiness thereof.

References Cited in the file of this patent

UNITED STATES PATENTS

| | | |
|---|---|---|
| 2,244,184 | Austin et al. | June 3, 1941 |
| 2,304,369 | Morgan et al. | Dec. 8, 1942 |
| 2,720,508 | Melamed | Oct. 11, 1955 |
| 2,760,944 | Greenlee | Aug. 28, 1956 |
| 2,855,372 | Jenkins et al. | Oct. 7, 1958 |

OTHER REFERENCES

Falkenburg et al.: "Oil and Soap," June 1945, pp. 143–48.